United States Patent
Araujo, Jr. et al.

(10) Patent No.: US 8,015,563 B2
(45) Date of Patent: Sep. 6, 2011

(54) MANAGING VIRTUAL MACHINES WITH SYSTEM-WIDE POLICIES

(75) Inventors: Nelson Sampaio Araujo, Jr., Redmond, WA (US); Abhishek Dhasmana, Redmond, WA (US); Lloyd Gene Giberson, Kirkland, WA (US); Angel Monterrubio, Redmond, WA (US); John Chad Parry, Newcastle, WA (US); Eugene Polonsky, Redmond, WA (US); Kendra Yourtee, Seattle, WA (US); Brian Wahlert, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1269 days.

(21) Appl. No.: 11/404,361

(22) Filed: Apr. 14, 2006

(65) Prior Publication Data

US 2007/0250833 A1 Oct. 25, 2007

(51) Int. Cl.
*G06F 9/455* (2006.01)
*G06F 15/177* (2006.01)
(52) U.S. Cl. .............................................. 718/1; 713/1
(58) Field of Classification Search ........... 718/1; 713/1
See application file for complete search history.

(56) References Cited

U.S. PATENT DOCUMENTS

| 7,260,616 | B1 * | 8/2007 | Cook | 709/218 |
|---|---|---|---|---|
| 7,299,468 | B2 * | 11/2007 | Casey et al. | 718/104 |
| 7,577,722 | B1 * | 8/2009 | Khandekar et al. | 709/220 |
| 2002/0069369 | A1 * | 6/2002 | Tremain | 713/201 |
| 2003/0196089 | A1 * | 10/2003 | Alve et al. | 713/172 |
| 2005/0125694 | A1 * | 6/2005 | Fakes et al. | 713/201 |
| 2005/0289282 | A1 * | 12/2005 | Ouriel et al. | 711/1 |
| 2006/0265711 | A1 * | 11/2006 | Bantz et al. | 718/1 |

* cited by examiner

*Primary Examiner* — Meng An
*Assistant Examiner* — Blake Kumabe
(74) *Attorney, Agent, or Firm* — Woodcock Washburn LLP (57) ABSTRACT

An administrative authority for virtual machines can send one or more delegated policy settings to a virtual machine manager. The virtual machine manager can in turn send management instructions that include the one or more policy settings to one or more virtual machine hosts. As such, a user's request for a virtual machine at a virtual machine host can be granted or denied based on the delegated policy settings. The policy settings can be updated periodically, and can include additional information about starting, stopping, expiring, saving, or even deleting virtual machines by particular users, as well as users accessing from particular locations. In addition, an agent operating at the virtual machine host can monitor and report virtual machine activity, to ensure unauthorized virtual machines are quickly stopped and reviewed until authorized.

19 Claims, 4 Drawing Sheets

MANAGING VIRTUAL MACHINES WITH SYSTEM-WIDE POLICIES

CROSS-REFERENCE TO RELATED APPLICATIONS

N/A

BACKGROUND

Background and Relevant Art

Enterprises distribute and manage different types of resources (software, hardware, or combinations thereof) in a computerized environment in a number of different ways. For example, an enterprise might use one or more system administrators to authorize and set up physical computer systems at multiple locations, whether as servers, or as personal computer systems. One or more of these system administrators might also have the responsibility of creating various electrical power and network communication connections to the hardware. The enterprise might also use the same or different one or more system administrators to also install various software resources on the physical hardware, such as operating systems, application programs, and the like. The enterprise might further use the same or different one or more system administrators to implement software updating policies, and monitor other organizational network issues.

As such, one can appreciate that some larger enterprises might employ a number of different system administrators to manage hundreds of computerized systems in the organization. In some cases, the enterprise might set up each system administrator to have the keys and access policies needed to effectively perform his or her duties. These keys and access policies might even be narrowed within a particular context.

For example, in addition to the above-mentioned system administrator roles, the organization might set up a group of system administrators only to manage hardware resources specific to storage issues. Within this group of administrators, the enterprise might further delegate specific roles so that some administrators are set up to manage some geographical or network locations of certain storage servers, while others are set up to manage certain types of storage servers, and so forth. Similarly, the enterprise might set up a group of system administrators only to administrate network access issues. This group could still delegate within the group of administrators various responsibilities for specific user names and passwords within only certain geographical or network locations within the enterprise.

Thus, in conventional networks, a local user that desires to access a particular resource might need to first gain permission on various levels with potentially multiple system administrators, who in turn might need to interface with potentially multiple different system administrators higher up in the chain. For example, the user might need to first receive a computer system, which alone might require multiple system administrators to pass along requests to an ultimate authority. Similarly, the user might need to request and receive a user name and password from potentially different system administrators, which might pass along the request to a different ultimate authority. In each instance, each system administrator might check to see if the user's request can be authorized, and if not, pass the request along to a higher level system administrator.

Although some system administrators might become burdened handling user name and password requests for an entire organization, conventional system administrator hierarchies have heretofore been able to handle such loads for certain numbers of users and machines within an assigned organizational segment. Unfortunately, recent advances in computerized systems, while providing a number of benefits on one hand, can often be coupled with certain administrative costs, which might overwhelm conventional system administrator hierarchies.

For example, hardware for computerized systems is becoming increasingly faster and more capable. In particular, the present storage, memory, and processing capacities of conventional servers means that simply providing conventional storage and/or network traffic management functions may not be enough to fully utilize the server. Organizations can often make better use of their resources not only by sharing storage or processing power between computers, but also by installing additional one or more virtual computer systems (i.e., "virtual machines") on the same single physical computer system. In particular, in addition to hosting several storage volumes on which are installed various email or storage servers, a single host server could also have installed thereon a large number of virtual machines.

Generally speaking, virtual machines can be installed on a separate partition of a host's storage, and can be installed with a unique instance of a particular operating system. The virtual machine can also receive an allocated portion of host memory and processing power. Because of these and other features, virtual machines can be easily distinguished from other virtual machines, and even from the host server on which it is installed. To other users on the network, the virtual machine would simply appear as a separately addressable computer system, such as any other physical computer system on the network. The virtual machines could then be used for a wide range of purposes, such as to be used as another server on the network, for software or hardware testing purposes, as the main computer system for a thin client, and so forth.

In addition to this functionality, virtual machines provide the added benefit of being able to be set up and removed fairly easily. For example, an administrator for a particular host computer system can receive a request for a virtual machine, manually allocate appropriate resources on the host computer, and then install the requested virtual machine. When the virtual machine is no longer needed, the administrator can manually select one or more commands to shut down or even delete the virtual machine at the host server. Due to the relative simplicity of setting up virtual machines, and due to the flexibility and capabilities provided by a virtual machine, some organizations might easily multiply the effective number of computer systems operating on their network from hundreds of computer systems to thousands of computer systems including virtual machines.

Conventional administrator hierarchies otherwise set up to handle a few hundred physical computer systems are generally ill-equipped for such volume. In particular, conventional administrative set ups may be unable to adequately manage additional requests for virtual machines, permission controls within each virtual machine, the operation of each virtual machine, and so forth with meaningful consistency. By contrast, simply hiring more system administrators to handle the burdens of additional virtual machines is less desirable from a number of standpoints. For example, some enterprises may even prefer more self-service options, and do not want to add costs where technical administrative staff may not otherwise be readily available.

Accordingly, there are a number of issues that can be addressed when deploying a large number of virtual machines within an enterprise.

BRIEF SUMMARY

Implementations of the present invention solve one or more problems in the art with systems, methods, and computer program products configured to distribute virtual machine management using automated processes. In particular, one or more administrative authorities can delegate system policies to one or more virtual machine managers. The one or more virtual machine managers can, in turn, further delegate management instructions to one or more virtual machine hosts. The management instructions can include the one or more policy settings, and/or instructions regarding creation or some other operational control of one or more virtual machines. Virtual machines that are operating outside of the delegated policy settings can be quickly shut down until further notice. Virtual machines can thus be automatically granted, operated, policed, and otherwise managed within the confines of automated system policies.

For example, a method from the perspective of a virtual machine manager for of automatically managing the creation and operation of one or more virtual machines through delegated authority can involve receiving electronic control instructions from a virtual machine authority. The control instructions can include one or more policy settings. The method can also involve passing the one or more policy settings to a configuration store. In addition, the method can involve receiving a user request to create a virtual machine in accordance with one or more parameters. Furthermore, the method can involve determining from the one or more policy settings that the user request can be granted. Still further, the method can involve sending electronic management instructions to a virtual machine host. For example, the management instructions can identify that the requested virtual machine can be created in accordance with the one or more parameters.

In addition, a method from the perspective of a virtual machine host of a method of automatically managing the creation and operation of the one or more virtual machines through the delegated authority, comprising the acts of receiving electronic management instructions from a virtual machine manager. The management instructions can include one or more policy settings for the virtual machine host. In addition, the method can involve receiving one or more electronic requests to create a virtual machine in accordance with one or more parameters. The method can also involve identifying from the one or more policy settings that at least one of the one or more requests can be granted. Furthermore, the method can involve creating the virtual machine in accordance with the at least one request. Still further, the method can involve identifying one or more operating characteristics of each of one or more virtual machines installed at the virtual machine host.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products configured to distribute virtual machine management using automated processes. In particular, one or more administrative authorities can delegate system policies to one or more virtual machine managers. The one or more virtual machine managers can, in turn, further delegate management instructions to one or more virtual machine hosts. The management instructions can include the one or more policy settings, and/or instructions regarding creation or some other operational control of one or more virtual machines. Virtual machines that are operating outside of the delegated policy settings can be quickly shut down until further notice. Virtual machines can thus be automatically granted, operated, policed, and otherwise managed within the confines of automated system policies.

As such, one will appreciate that implementations of the present invention can be applied in a wide variety of virtualized environments, particularly virtual environments in which large numbers of resources can be distributed in many locations. This is due at least in part since system-wide policies, as well as user-specific, virtual machine-specific, and host server-specific policies can be managed and enforced using automated communication and monitoring means. The various system policies in turn can be delegated based on assigned roles, much like in a traditional hierarchy of human administrators. Automated components, however, provide more consistent provisioning and enforcement for large scale machine deployments.

For example, rather than requiring a user to, for example, fill out a help desk ticket for a particular physical machine with a particular operating system, memory, and/or storage specification, multiple users can easily create a virtual machine themselves through one or more user interfaces in a matter of minutes. In particular, user interfaces can allow users to make particular virtual machine requests, which can then be handled by a combination of automated service providers and agents that grant or deny particular requests in accordance with delegated system policy. As will be discussed more fully herein, the delegated policies (e.g., FIG. 1C, 107) can allow, for example, a particular operator (human or automated) to determine if a user has a valid account for creating virtual machines, and if the user's specifications in the request are allowed for a particular virtual machine host. Thus, implementations of the present invention can include defined roles (e.g., 160, FIG. 1C) for operators and users in the virtualized system 100.

Figure 1A:
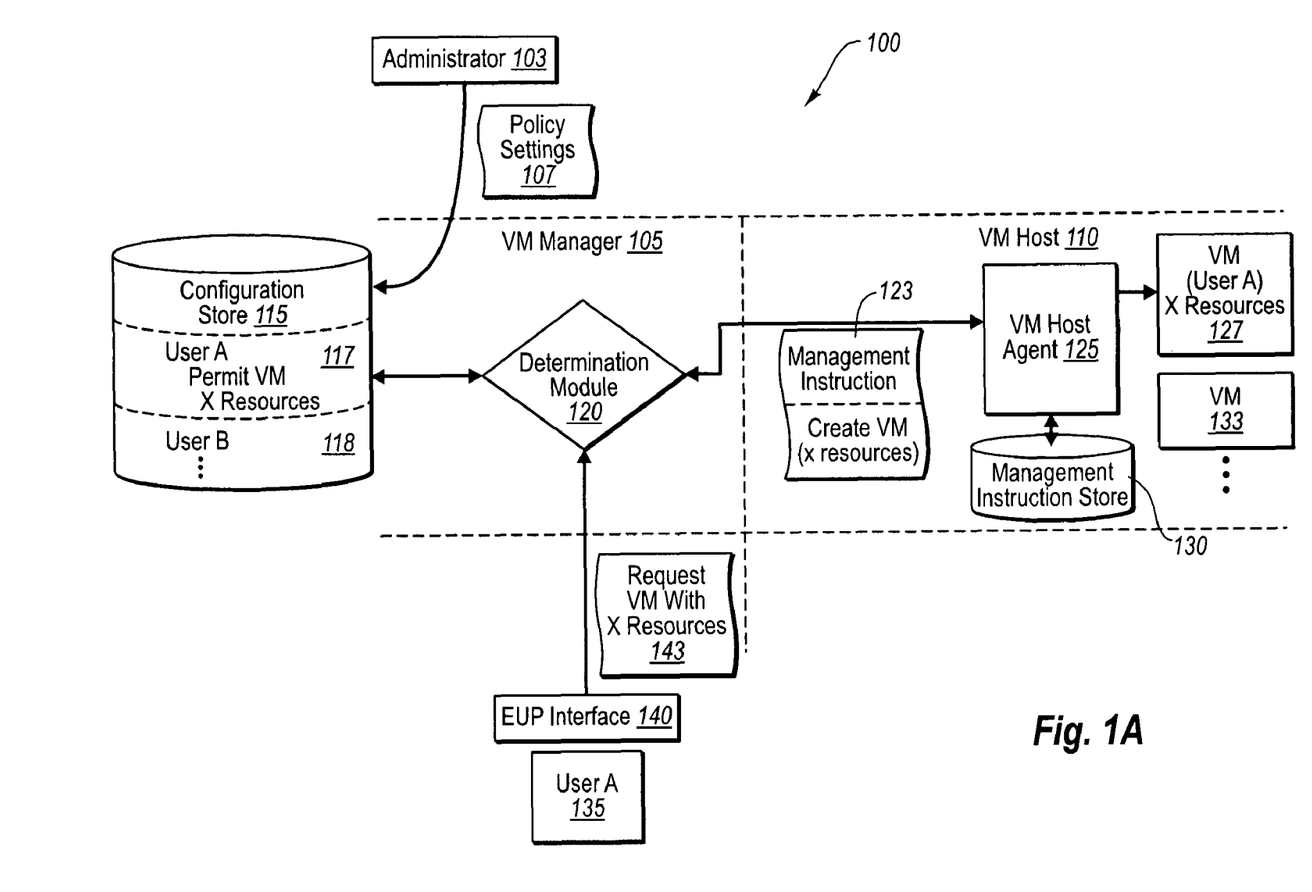
FIG. 1A illustrates an overview schematic diagram in accordance with an implementation of the present invention in which a virtual machine manager implements policies received from an administrative authority at a virtual machine host.
Figure 1B:
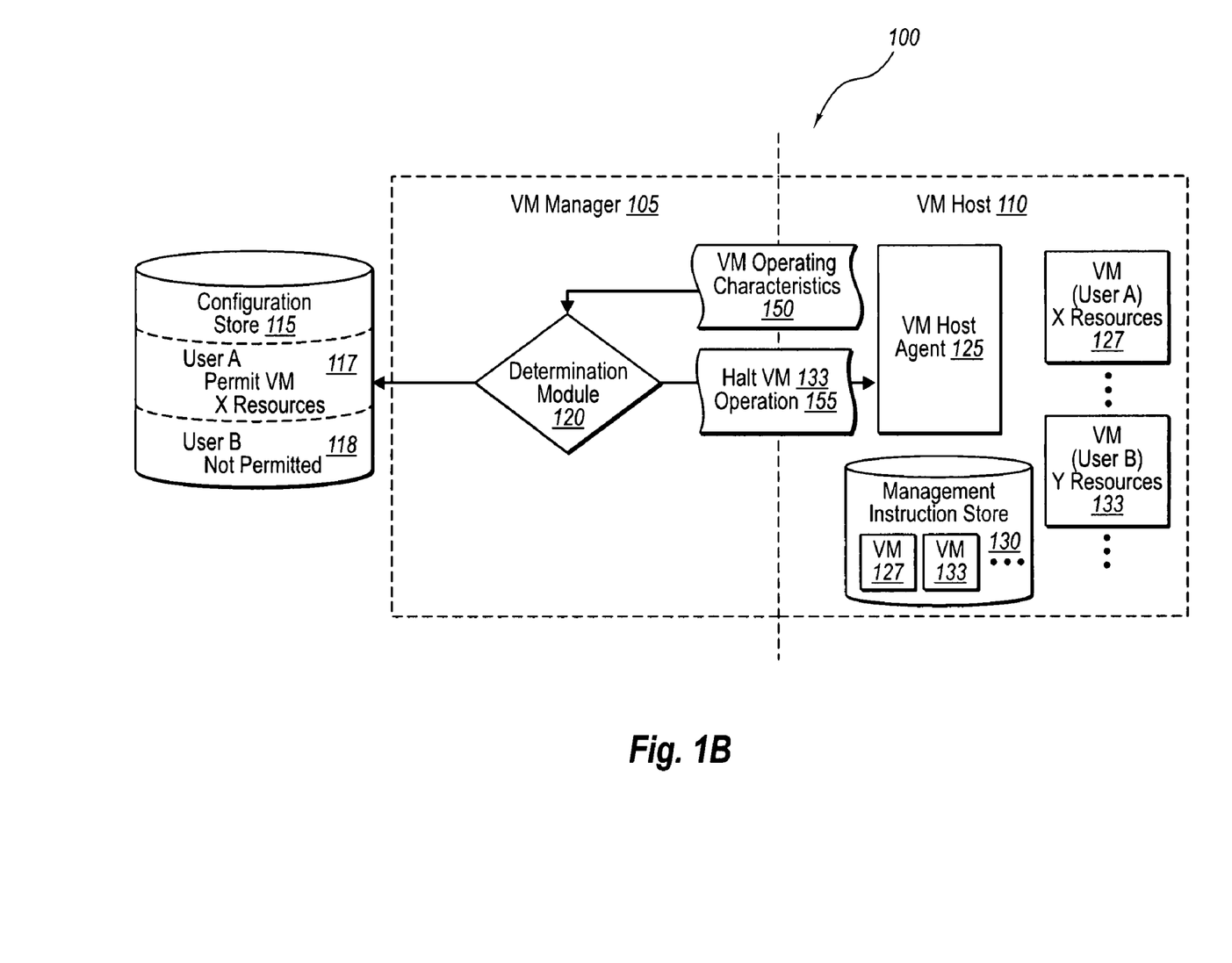
FIG. 1B illustrates the overview schematic diagram as shown in FIG. 1A, in which the virtual machine manager performs self-healing operations in accordance with an implementation of the present invention.
Figure 1C:
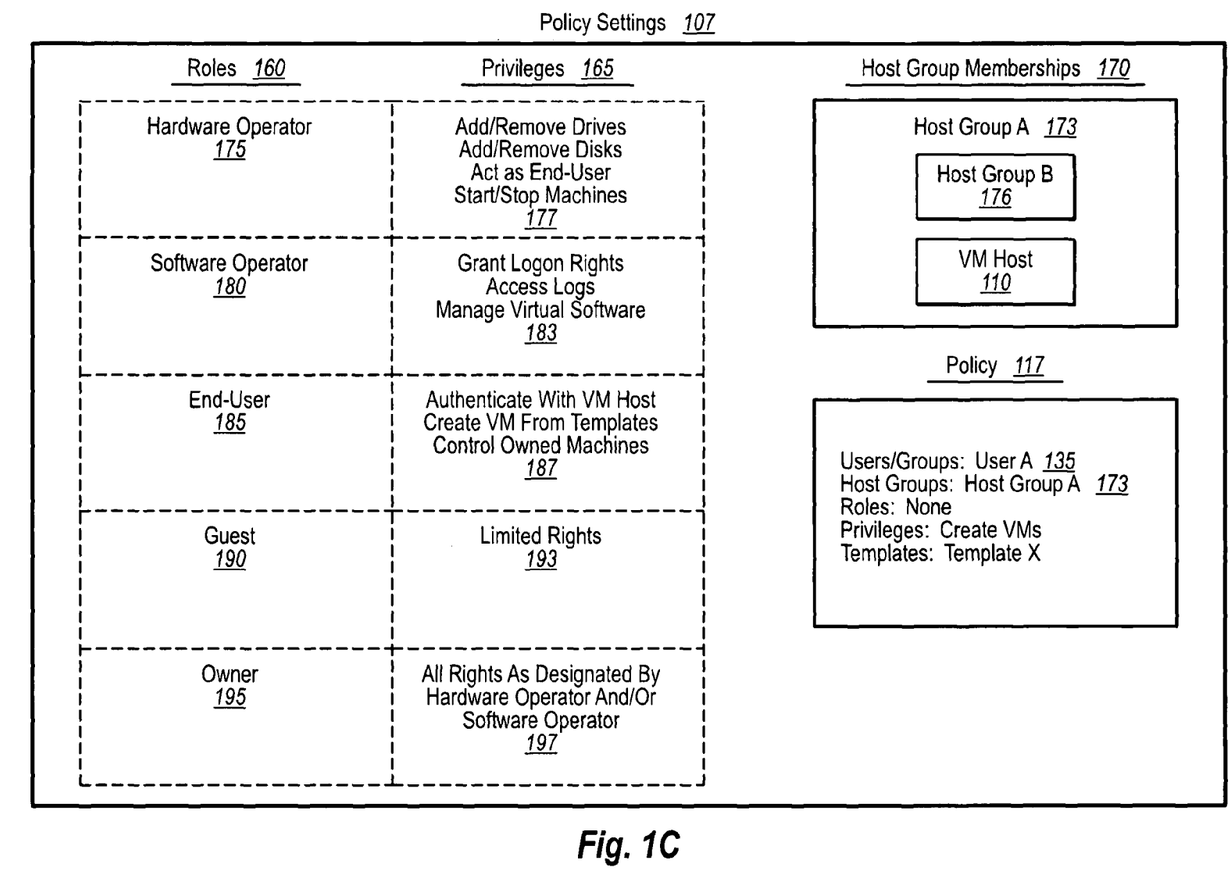
FIG. 1C illustrates a conceptual diagram of an example set of the policy settings illustrated in FIGS. 1A and 1B, in accordance with an implementation of the present invention.

With advanced reference to FIG. 1C, for example, one particular role (e.g., 160, with corresponding policies) in accordance with an implementation of the present invention includes a hardware operator (e.g., 175). A hardware operator can be provided with permissions (e.g., 177) to start and/or stop any virtual machine, save and/or resume virtual machine operations, manage snapshots (e.g., backup and restore images), connect and/or disconnect virtual machines to and/or from a network, and change virtual machine network topology (e.g., change "physical" network connections.) The hardware operator might also be enabled to add and/or remove Network Interface Cards ("NICs"), and manage end-user membership groups (e.g., 173, 176) for the system. In addition, the hardware operator can be provided privileges to add and/or remove hard disks, add and/or remove optical drives, and so on. In some cases, a hardware operator can also act on behalf of an end user (discussed below) by specifying an end user group when performing an operation (e.g., creating a new virtual machine).

Another role in accordance with an implementation of the present invention can include a software operator (e.g., 180). A software operator might be restricted from accessing the virtual machine hardware, but nevertheless given responsibilities (e.g., 183) of managing virtual software (e.g., in system 100). As such, the software operator might be provided with such responsibilities and policy controls to enable, for example, management of "Software Data Center Operations." For example, the software operator can be tasked with granting privileges to logon to a system (or systems). The service provider can also grant the ability to access system logs, including application, security, and/or other software-related logs, as well as the ability to install and/or remove applications or services in the virtual machine.

In addition, implementations of the present invention also include an end user role (e.g., 185, and corresponding policy settings). The end user role can generally have restricted permissions (e.g., 187) within the virtualized environment, but still have particular access rights with respect to certain virtual machines. For example, an end user may be provided the right to authenticate with (or connect to) a virtual machine host (or other appropriate server). The end user might also be granted the right to create a new virtual machine from an approved template, where the approved template falls within approved parameters dictated by the hardware operator (or corresponding policies). The end user may also be provided with rights to control (i.e., start, stop, pause, etc.) virtual machines that the end user has created and/or owned, including deleting virtual machines.

The hardware operator and/or software operator can further restrict (or enable) an end user by assigning several end users to certain group policies that include one or more individualized assignments and groupings (e.g., 170). For example, a hardware operator (i.e., via a hardware policy) might provide certain groups (e.g., 173, 176) of end users with the ability to save an image to a virtual machine library (e.g., 130), delete an image from a virtual machine library, create a virtual machine from scratch, and create a virtual machine from an ISO file.

Implementations of the present invention further include a "guest" role (e.g., 190, and related policy settings). For example, a guest can be provided the minimum security privileges (e.g., 193) possible on the system, whereby virtually everything is denied (by default) to a guest user, unless explicitly granted to the guest. As such, the guest might be granted only the privilege of authenticating to the server (e.g., virtual machine manager 105, and/or virtual machine host 110). Upon successful authentication, the guest might also be able to access objects other users (or administrators) assigned to the guest. The guest may be restricted, however, from creating new objects (i.e., virtual machines) or delete existing ones. In one implementation, a guest role can be important for technical support and trouble shooting roles. For example, an end user who is currently experiencing problems with a particular virtual machine can grant a guest role (i.e., limited permissions) on the user's virtual machine to third parties, so that those third parties can help analyze and figure out a particular problem, without necessarily granting "user" rights on the system.

In addition to these particular roles, implementations of the present invention further provide for various aggregated conceptual roles and policies. For example, one concept in accordance with aspects of the present invention includes a "team" concept, which can provide high-level permissions in a manner similar to what might ordinarily be given a user. For example, a team can be associated with a subject, such as with local and/or global domain groups. In addition, the team can be assigned to user accounts, wild carded accounts (e.g., v-* or t-*), user credentials, and secure certificates.

Furthermore, implementations of the present invention include a "topology" concept, such as bundles or packages, in which virtual machines can be allocated into groups based on logical indicia. For example, a specific product might require running particular types of operating environments servers. An organization might then create a topology that includes the types of operating environments for specific products. Once defined, an end user could simply request "deploy product X," and all the corresponding virtual machines could then be created and configured properly.

Still further, implementations of the present invention include a "host group" (e.g., 173, 176) concept, which can be arranged contextually by an administrator. For example, a host group can be used to manage a related group of virtual machine hosts (e.g., 110) as one, such as with modifying end user permissions, performing virtual machine host maintenance, and so forth. In one implementation, the "host group" concept can further include hierarchical ordering, such that, for example, one host group (i.e., a parent host group—173) contains not only one or more virtual machine hosts (e.g., 110), but also as one or more different host groups (i.e., child host groups—176). An administrator can thus configure end-user and even virtual machine host permissions in a number of different ways.

For example, the administrator can configure an inheritance model, where end-user permissions apply not only to parent host groups but also to all child host groups. This inheritance structure can be further applied in a number of different ways. For example, permissions directed explicitly to a particular child host group explicitly can be aggregated together with the permissions inherited from the parent host group. This might allow a user to receive permissions that represent the union of the child host group and parent host groups permissions. An administrator (e.g., 103) can even prevent or adjust the configuration of such an inheritance model by stopping inheritance entirely, or by supplementing permissions to a particular child or parent host group (or even for a particular user). In one implementation, for example, an administrator can stop inheritance by setting a property on a particular child host group that indicates that the child host (or host group) cannot inherit permissions from a parent host (or host group).

Similarly, an administrator can set a default configuration so that a broader policy controls, or that a narrower policy controls, as well as whether the narrower or broader policy applies on specific child host groups, parent host groups, and even specific virtual machine hosts. In particular, administrator 103 (e.g., FIG. 1A) can issue a policy setting 107 that indicates a "deny policy," which is also configured within a context where a narrower "deny policy" overrides a broader "allow policy." For example, a deny policy can be configured to exclude user 135 from the ability to start virtual machines (even a particular virtual machine), even if an inherited policy from a parent host group would otherwise allow user 135 to start them.

Implementations of the present invention also include a virtual machine "ownership" concept (e.g., 195, with privileges 197), such as where an end user has created a virtual machine. Under the ownership concept, other end-users can be restricted from accessing the virtual machine (by default) without specific permission otherwise granted by the owner. (Higher level administrators, however, such as hardware operators might still be allowed to access the machine.) Nevertheless, the end user can in some cases provide additional permissions to the virtual machine, such as providing secondary owners with the same rights on the virtual machine as the original owner. Generally, if privileges have been revoked, the owner can be restricted from starting or stopping the particular virtual machine, but can continue to own the virtual machine.

These above-mentioned roles and restrictions can be further delegated within particular levels of permission (e.g., 165) granularities in virtualized system 100. For example, a "system" privilege can be, as the name implies, a privilege that affects the entire virtualized system 100. A "team" privilege can be one that affects any virtual machines assigned and/or owned by a particular team. A "topology" privilege can be one that affects virtual machines belonging to a particular topology (e.g., set up for running a particular application or operating system). Furthermore, a "virtual machine" level privilege can be one that affects only specific virtual machines.

Within these conceptual delegations, implementations of the present invention further include certain limited privilege levels of virtual machine use. For example, some users can be granted a "view only" privilege, which allows the users only to see the display provided by the virtual machine, but prohibit the users from typing or moving the cursor on the display. Other users can be granted a "remote control" privilege, which provides a user with access to the mouse and keyboard of operations of the virtual machine.

In addition, still other users might be granted an "operator" role (i.e., a set of individual actions, or "privileges" 165), which provides a user the ability to start, stop, and/or reset a given virtual machine, but not see or interact with the virtual machine display. Furthermore, implementations of the present invention include more broad based permissions, such as a "manager" role which can be considered as the junction of the "operator" and "remote control" roles and privileges described above. As also previously described, implementations of the present invention further include an "owner" role or property, which provides all privileges to a particular virtual machine given to the virtual machine owner. Along these lines, implementations of the present invention further include an "administrator" role, which can include unfettered access rights to all virtual machines in the virtualized system 100.

Accordingly, the foregoing text highlights a number of the various policy settings that can be used to restrict user and administrator rights and operations in system 100, as well as rights to police virtual machine operations. In one implementation, a policy (or one or more policy settings) can be considered to include 1) one or more host groups, which indicates the virtual machine host(s) to which the one or more policy settings apply; 2) one or more users who can exercise the particular one or more policy settings; 3) a set of roles and/or privileges that indicate the actions that the identified user(s) can take; and 4) a set of virtual machine templates, which can include, for example, the types of virtual machines that the identified user(s) can create. In addition, the foregoing text provides a number of mechanisms for users to share virtual machines on a fairly limited basis, and thereby enable a wide range of control options with third-party users.

Generally, one will appreciate from the foregoing and following text that the above-identified policies (which include various contextual roles and privileges) can be distributed electronically throughout the virtualized system (e.g., 100). Furthermore, systems (e.g., service providers, hosts, etc.) that receive certain policies are generally restricted from operating outside of the delegated policies.

Referring now to FIG. 1A, the figure illustrates an overview schematic diagram of a virtualized system 100, in which a virtual machine manager 105 receives and implements virtual machine policies through one or more virtual machine hosts 110. As a preliminary matter, FIG. 1A shows virtual machine manager 105 and virtual machine host 110 in relative proximity for purposes of illustrative convenience. One will appreciate that a virtual machine manager can exist on the same physical machine as a virtual machine host; nevertheless, in many cases, the service provider and virtual machine host will exist separately on different on machines. For example, a virtual machine manager could be located in an administration center, while one or more virtual hosts are located at data centers, or in more distributed locations throughout the organization.

In any event, one role of a virtual machine manager is to implement policies received from a remote authority. For example, FIG. 1A shows that virtual machine manager receives electronic control instructions, from a virtual machine authority (i.e., administrator) 103, such as a hardware and or software operator. Generally, electronic control instructions comprise computer-readable and/or computer-executable instructions received over a network connection, including any of a wired, wireless, or optical network connection from the virtual machine authority. As such, electronic control instructions can include network packaging information. Electronic control instructions can further include instructions from administrator 103 regarding implementation of policy settings 107. Thus, as used herein, the term "policy settings" may be interchanged in some cases with "control instructions."

As also discussed above, policy settings 107 comprise computer-readable and/or computer-executable instructions that define any number or type of settings regarding the operation of virtual machines at virtual machine host 110, including the particular types of users that can access or create virtual machines. Policy settings 107 can further include such information as from where particular end users can access a particular virtual machine, such as from a wide or local area network. For example, an end user with ownership rights may be granted the ability to access virtual machine 127 from both an internet and intranet connection, while a different end user may have delegated "view only" or "remote control" rights over the internet, but have full delegated ownership rights on the local network.

In any event, upon receiving the electronic control instructions, virtual machine manager 105 can pass the corresponding specific policy settings 107 contained therein to a configuration store 115. Generally, configuration store 115 comprises one or more volumes at (or accessible to) virtual machine manager 105, and can also comprise one or more database applications stored therein to help manage this data. In one implementation, for example, configuration store 115 maintains policy settings 107 in a relational database. However managed, FIG. 1A shows that configuration store 115 comprises at least policy settings 117 and 118, such as for users A and B. In particular, FIG. 1A shows that policy settings 117 (see also FIG. 1C) allow user A to create virtual machines in accordance with one or more parameters (e.g., "X resources"). For example, policy settings 117 (FIGS. 1A, 1C) can indicate that user A is granted "owner" privileges for virtual machines not to exceed a total of 100 gigabytes of storage and 2 gigabytes of memory in, for example, a "Test Lab" host group.

In addition, FIG. 1A also shows that the user A 135 makes a request 143 to create a virtual machine. In one implementation with respect to the MICROSOFT operating environment, for example (as illustrated), user A can make request 143 through an End User Provisioning ("EUP") interface 140, such as a Virtual Machine Remote Control ("VMRC") client. For example, virtual machine host 110 can provide EUP interface 140 through a web service. In another implementation, virtual machine manager 105 can act as a proxy server by providing EUP interface 140 on behalf of virtual machine host 110 (or any other appropriate host). However provided, user A can generally log in to a network address, which in turn provides the EUP interface 140. Alternatively, user A opens an application program at a user computer system (not shown), which in turn contacts an appropriate network address that calls the EUP interface 140. Similarly, user A can communicate directly with manager 105.

FIG. 1A further shows that user A requests 145 creation of a virtual machine with one or more parameters, in this case illustrated as "X Resources." For example, user A requests creation of a virtual machine having the same parameters (or within the same parameters) as those specified in policy settings 117, such as 100 gigabytes or fewer or storage space and 2 gigabytes or fewer or memory allocation. Of course, request 143 can also include any appropriate user authentication for validating the request, such as user name and password, and any other appropriate tokens, keys, or certificates.

As such, FIG. 1A also shows that virtual machine manager 105 receives request 143 and processes the request, for example, through determination module 120. Determination module 120 comprises one or more sets of computer-executable instructions configured at least in part to interface with configuration store 115 and request information regarding policy settings. As such, FIG. 1A shows that determination module 120 compares the one or more parameters of request 143 with policy settings 117 in configuration store 115 to determine whether the requested "X resources" are permitted for user A. In this particular illustration, determination module 120 identifies that request 143 is appropriate, and, as such, virtual machine manager 105 can send corresponding instructions. For example, FIG. 1A shows that virtual machine manager 105 sends management instructions 123 to virtual machine host 110, which include a request 123 to create a virtual machine.

Generally, management instructions comprise one or more sets of computer-readable and/or computer-executable instructions that can be received and understood by virtual machine host 110. In some cases, management instructions simply include policy settings (e.g., 107 whether all, or a subset thereof) that are delegated over virtual machine host 110. For example, virtual machine manager 105 may be responsible for managing hardware and software of several virtual machine hosts, each of which has responsibility over only certain users and/or virtual machines for a particular "team," "topology," or the like.

Thus, virtual machine manager 105 can send various policy settings in the form of management instructions that are unique for a particular virtual machine host, but nevertheless within the broader authority granted in policy settings 107. For example, policy settings 107 might indicate that user A can be an owner of one or more virtual machines, while management instructions 123 might further restrict on what virtual host the user can create and operate virtual machines. As previously discussed, management instructions 123 can further include such limiting information as how long those virtual machines are allowed to exist, who can start and stop the virtual machines, at what network location users can access the virtual machines at virtual host 110, and so forth. Management instructions 123 can also include such as information as in what host groups the virtual machines can be created, and from what templates the virtual machines can be created, and so forth. In addition to delegated policy settings, management instructions can also include specific requests, such as authorized requests to create a particular virtual machine. As shown in FIG. 1A, for example, management instructions 123 include a relayed request in response to message 143 to create a virtual machine for user A based on "X Resources."

Thus, upon receiving instructions 123, virtual machine host 110 can create the corresponding virtual machine, such as virtual machine 127 having "X resources." Generally, virtual machine host 110 can receive and execute management instructions 123 through any appropriate agents operating thereon. For example, at a later time, a user (e.g., user A) might ask virtual host agent 125 directly to create another virtual machine (e.g., based on a subset of X Resources). Virtual machine agent 125 can then consult the management instruction store 130 to determine if the request is appropriate. One will appreciate, therefore, that virtual machine host 110 can host any number of virtual machines as appropriate for its particular hardware, memory, and other processing resource capabilities. For example, FIG. 1A also shows that virtual machine host 110 further hosts virtual machine 133.

Although virtual machine host 110 will typically operate according to a set of privileges that are narrower that what has been delegated to virtual machine manager 105 from a remote administrator 103, there may be situations when something occurs outside of those bounds. For example, a different user (i.e., user B) might have been allowed at one point to create or operate virtual machines under one set of privileges. At a later point, those privileges might have been revoked, but the virtual machine host 110 may not yet have received the corresponding management instructions indicating this. For example, there may have been a momentary lapse in network communication, which allowed user B to create an unauthorized virtual machine, or perform some other unauthorized action.

Accordingly, FIG. 1B illustrates at least one implementation in which virtual machine host agent 125 can provide self-healing mechanisms and thus ensure that unauthorized virtual machines do not run unchecked indefinitely. For example, virtual host agent 125 can be configured to continually monitor the operation of each of the one or more virtual machines at host 110. These operating characteristics can include such information as unique virtual machine identifiers, names of virtual machine owners and/or other operators, resources used by the virtual machines, and so forth. Virtual machine host agent 125 can then report the various operating characteristics back to the virtual machine manager 105. For example, FIG. 1B shows the virtual machine host agent 125 passes an operating characteristics message 150 to virtual machine manager 105. (Host agent 125 additionally or alternatively can also send message 150 to a different monitoring agent, such as in the MICROSOFT environment, a System Management Server—"SOS," or a MICROSOFT Operations Manager—"MOM.")

Virtual machine manager 105 can then compare the received operating characteristics 150, such as through determination module 120. In particular, determination module 120 can compare the data of operating characteristics 150 with the policy settings in configuration store 115, and thereby determine any inconsistencies. In this particular case, FIG. 1B also shows that virtual machine host 110 has allowed creation and/or operation of virtual machine 133 for user B based on "Y Resources." Nevertheless, configuration store 115 indicates in policy settings 118 that user B is not permitted to create virtual machines. Accordingly, FIG. 1B shows that virtual machine manager 105 can send instructions to stop, pause or delete this particular virtual machine at virtual machine host 110. For example, FIG. 1B shows that virtual machine manager 105 sends updated management instructions in the form of message 155, which includes management instructions to halt operation of virtual machine 133.

Upon receipt, virtual machine host 110 (e.g., via host agent 125) can perform the requested management instructions, such as by stopping virtual machine 133, or deleting the virtual machine entirely. In at least one implementation, host agent 125 simply pauses or stops virtual machine 133 until further notice from virtual machine manager 105. For example, virtual machine manager 105 could relay an additional request (not shown) to administrator 103 to confirm that user B is not permitted to use virtual machine 133. Alternatively, determination module 120 could determine that user B can use virtual machine 133, but only with a different set of resources. Thus, virtual service provider 105 could provide a subsequent message that confirms that virtual machine 133 is actually authorized; or that virtual machine 133 should be deleted, assigned to a different owner, or adjusted within a set of new operating characteristics.

Accordingly FIGS. 1A and 1B provide a number of components for implementing system wide virtual machine policy settings, as well for policing and healing errant virtual machine operations. In particular, FIGS. 1A and 1B illustrate how one or more virtual machine managers and one or more virtual machine hosts can be configured to host and manage a large number of virtual machines relatively easily and securely despite relatively scant human control.

Figure 2:
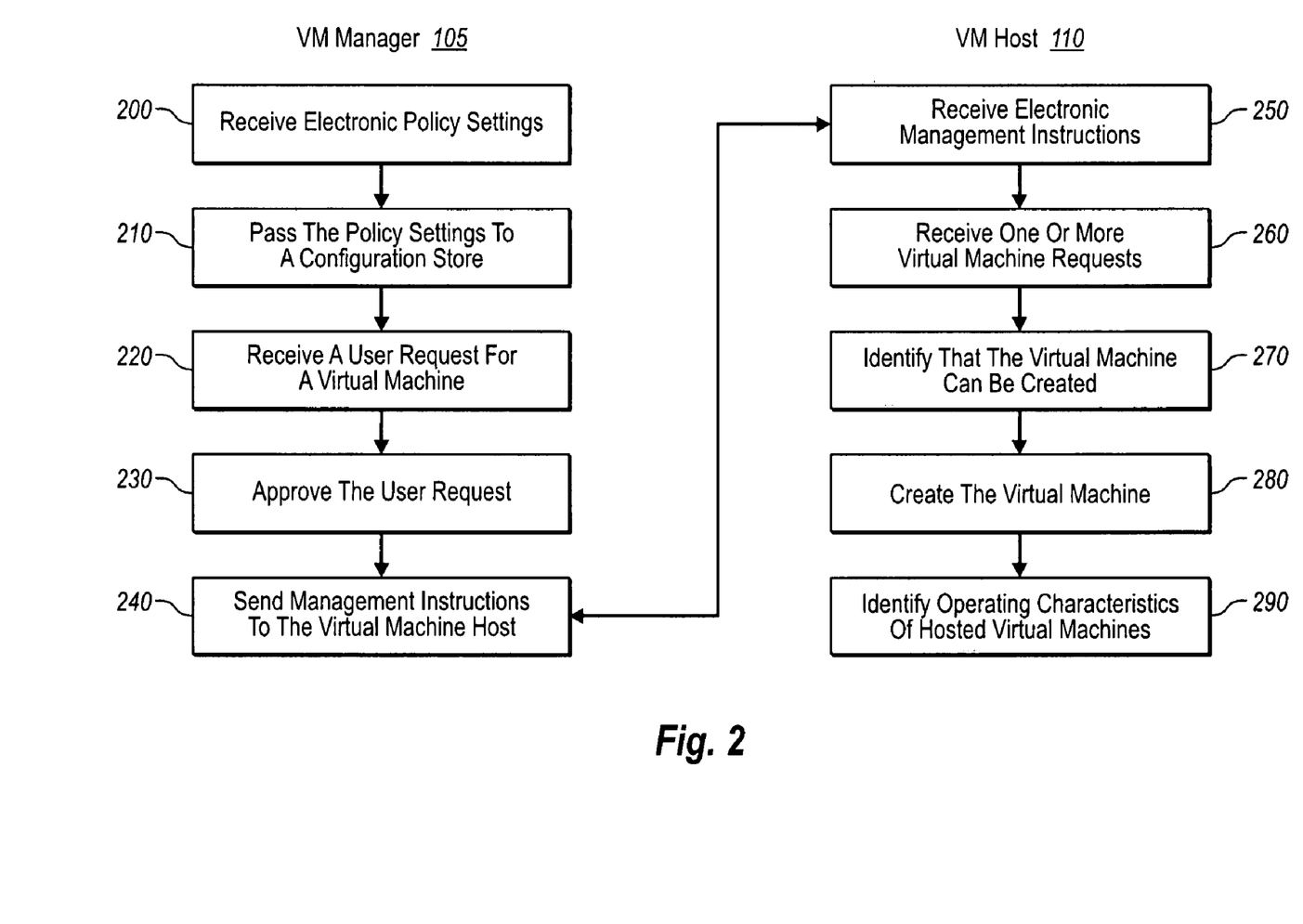
FIG. 2 illustrates flowcharts of methods comprising one or more acts from the perspective of a virtual machine manager and a virtual machine host for automatically managing the creation and operation of virtual machines through delegated authority in accordance with implementations of the present invention.

Implementations of the present invention can also be described in terms of methods having one or more acts for achieving a particular result. For example, FIG. 2 illustrates methods from the perspective of virtual machine manager 105 and virtual machine host 110 for implementing system wide policy settings for automatically managing the creation and operation or one or more virtual machines through delegated authority. The flow charts illustrated in FIG. 2 are described below with reference to the components and diagrams in FIGS. 1A and 1B.

As shown in FIG. 2 for example, a method from the perspective of virtual machine manager 105 of automatically managing the creation and operation of one or more virtual machines through delegated authority comprises an act 200 or receiving electronic control settings. Act 200 includes receiving electronic control instructions from a virtual machine authority, the control instructions comprising one or more policy settings. For example, FIG. 1A shows that virtual machine manager 105 receives electronic control instructions that include policy settings 107 from administrator 103.

In addition FIG. 2 shows that the method from the perspective of virtual machine provider 105 can comprise an act 210 of passing the policy settings to a configuration store. Act 210 includes passing the one or more policy settings to a configuration store. For example FIG. 1A shows that, upon receiving policy settings 107 from administrator 103, virtual service provider 105 can pass those policy settings 107 (e.g., through determination module 120) to configuration store 115. As described herein, configuration store 115 can be a relational database or any other appropriate application or mechanism suitable for coordinating policy settings in an easily identifiable manner.

FIG. 2 also shows that the method from the perspective of virtual machine manager 105 comprises an act 220 of receiving a user request for a virtual machine. Act 220 includes receiving a user request to create a virtual machine in accordance with one or more parameters. For example, FIG. 1A shows that virtual machine manager 105 receives request 143 for creating a virtual machine with X resources from user 135 through EUP interface 140. As discussed herein, EUP interface 140 can be provided directly through virtual machine host 110, or by proxy through virtual machine manager 105, such as when located on separate physical machines. It is not necessary, however, for a "user request" to necessarily be received from a human user, as such. In particular, as much of these processes can be automated, a "user request" to create a virtual machine could also arise from an automated system acting that is requesting a virtual machine.

Furthermore, FIG. 2 shows that the method from the perspective from virtual machine manager 105 can comprise an act 230 of approving the user request. Act 230 includes determining from the one more policy settings that the user request can be granted. For example, FIG. 1A shows that determination module 120 receives request 143, and compares request 143 with data in configuration store 115. As shown in FIG. 1A, because user A 135 is allowed by policy 117 to create virtual machine in accordance with "X Resources," virtual machine manager 105 can grant the request.

In addition, FIG. 2 shows that the method from the perspective of virtual service provider 105 can comprise an act 240 of sending management instructions to the virtual machine host. Act 240 includes sending electronic management instructions to the virtual machine host, wherein the management instructions identify that the requested virtual machine can be created in accordance with one or more parameters. For example, as shown in FIG. 1A, upon determining (e.g., via determination module 120) that user A 135 can create a virtual machine, virtual machine manager sends management instructions 123 to virtual machine host 110. In one implementation, virtual machine host 110 host receives instructions 123 through virtual machine host agent 125.

Accordingly, FIG. 2 shows that the method from the perspective of virtual machine host 110 can comprise an act 250 of receiving electronic management instructions. Act 250 includes receiving electronic management instructions from a virtual machine manager, the management instructions comprising one or more policy settings for the virtual machine host. For example, FIG. 1A shows that virtual machine host 110 (e.g., via agent 125) receives management instructions 123 from virtual machine manager 125.

In addition, FIG. 2 shows that the method from the perspective from virtual machine host 110 includes an act 260 of receiving one or more virtual machine requests. Act 260 includes receiving one or more electronic requests to create a virtual machine in accordance with one or more parameters. For example, management instructions 123 shown in FIG. 1B may include delegated policy settings for virtual machine host 110, and can also include instructions (or an allowance) to create a particular virtual machine in accordance with "X Resources." Alternatively, a request to create a particular virtual machine can be received directly from user 135 or from virtual machine manager 105.

FIG. 2 also shows that the method from the perspective of the virtual machine host 110 can include an act 270 of identifying that the virtual machine can be created. Act 270 includes identifying from the one or more policy settings that at least one of the one or more requests can be granted. For example, virtual machine host 110 passes management instructions 123 to a management instruction store 130. As described herein, management instruction store 130 is generally analogous to configuration store 115 in that it comprises a database of the various policy settings for virtual machine host 110. In at least one implementation, management instruction store 130 and configuration store 115 are the same store, such as when provider 105 and host 110 are on the same physical system. In any event, if the user request did not accompany a management instruction (e.g., came directly from a user), virtual machine agent 125 can then evaluate the request with what is identified in management instruction store 130.

Furthermore, FIG. 2 shows that the method from the perspective of virtual machine host 110 can include an act 280 of creating the virtual machine. Act 280 includes creating the virtual machine in accordance with at least one request. For example, FIG. 1A shows that, upon receiving request 143 (or upon receiving instructions 123), virtual machine host 110 creates virtual machine 127. Generally, virtual machine host 110 creates the virtual machine so that it is identified as being owned by user 135, and such that it has particular resource and operation configurations that are consistent with policy settings 117 (e.g., via management instruction 123).

Still further, FIG. 2 shows that the method from the perspective of virtual machine host 110 can include an act 290 of identifying operating characteristics of the hosted virtual machines. Act 290 includes identifying one or more operating characteristics of each of one or more virtual machines installed at the virtual machine host. For example, FIG. 1B shows that virtual machine host agent 125 monitors activities of each machine 127, 123 and reports (e.g., via message 150) those activities to virtual machine manager 105. As a result, virtual machine manager can continually monitor activities on any or all assigned virtual machines hosts in system 100, and thereby ensure that virtual machines are operating in accordance with the policy settings delegated to service provider 105.

Accordingly, FIGS. 1A-2 provide a number of components and mechanisms for administering and enforcing system policies using primarily automated, computerized means. As such, implementations of the present invention provide a number of potential cost savings for enterprises desiring to provide virtualized computing systems in a consistent fashion.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for automatically managing the creation and operation of a virtual machine, comprising:
   receiving electronic control instructions from a virtual machine authority, the control instructions comprising a policy setting, the policy setting authorizing a creation of a virtual machine or an operation of a virtual machine;
   storing the policy setting in a configuration store;
   receiving a user request to create the virtual machine in accordance with a parameter;
   determining from the policy setting that the user request can be granted;

sending a first instruction to a virtual machine host, the virtual machine host creates the virtual machine in accordance with a parameter in response to receiving the first instruction;

identifying that the virtual machine at the virtual machine host is unauthorized to execute upon the virtual machine host because the virtual machine is operating outside of the policy setting in the configuration store; and sending a second instruction to the virtual machine host, in response to determining that the virtual machine is unauthorized, the virtual machine host halts the virtual machine from further operation, pauses the virtual machine, or deletes the virtual machine in response to receiving the second instruction.

2. The method as recited in claim 1, wherein a virtual machine manager executing on a first physical machine performs the operation of receiving electronic control instructions, and the virtual machine host comprises a second physical machine.

3. The method as recited in claim 1, wherein the policy setting limits operation of the virtual machine at the virtual machine host to any of a storage, memory, or processing resource parameter.

4. The method as recited in claim 1, further comprising:
receiving a change to the policy setting from the virtual machine authority.

5. The method as recited in claim 4, further comprising:
sending electronic updated management instructions to the virtual machine host, the updated management instructions restricting the virtual machine host differently from the prior management instructions.

6. The method as recited in claim 4, wherein the policy setting defines:
a user that can create a virtual machine at the virtual machine host;
a user that can share the virtual machine;
a user that can modify the configuration of the virtual machine; or
a role for a user.

7. The method as recited in claim 4, wherein the policy setting defines:
a user that can start operation of a virtual machine at the virtual machine host;
a user that can pause operation of a virtual machine at the virtual machine host;
a user that can resume operation of a virtual machine at the virtual machine host; or
a user that can stop operation of a virtual machine at the virtual machine host.

8. The method as recited in claim 4, wherein the one or more policy settings define at least one of:
a user that can save a virtual machine to a virtual machine library; or
a user that can delete a virtual machine from the virtual machine library.

9. The method as recited in claim 4, wherein the policy setting defines an expiration point for the virtual machine at the virtual machine host.

10. The method as recited in claim 4, wherein the policy setting restricts a user to accessing the virtual machine at the virtual machine host from a geographic boundary, a local area network boundary, or a wide area network boundary.

11. The method as recited in claim 4, wherein the virtual machine host is a member of a virtual machine host group that includes a second virtual machine host; wherein the virtual machine manager sends the management instructions to the virtual machine host or the second virtual machine host.

12. The method as recited in claim 11, wherein a user has a first privilege at the virtual machine host, and a second privilege at the second virtual machine host, the user having an aggregation of privileges for the host group comprising the first privilege and the second privilege.

13. The method as recited in claim 1, further comprising:
identifying that a second virtual machine at the virtual machine host is unauthorized to execute upon the virtual machine host because the second virtual machine is an unknown virtual machine.

14. The method as recited in claim 1, further comprising:
releasing the virtual machine upon identifying that the virtual machine is operating in accordance with an update to the policy setting.

15. A system for automatically managing the creation and operation of a virtual machine, comprising:
a processor;
a memory communicatively coupled to the processor when the system is operational, the memory bearing instructions that, upon execution by the processor, cause the processor to perform operations comprising:
receiving electronic management instructions from a virtual machine manager, the management instructions comprising a policy setting for a virtual machine host, the policy setting authorizing a creation of a virtual machine or an operation of a virtual machine;
receiving a request to create a virtual machine in accordance with a parameter;
identifying from the policy setting that the request can be granted;
creating the virtual machine in accordance with the request;
identifying an operational characteristic of the virtual machine installed at the virtual machine host;
identifying that the virtual machine at the virtual machine host is unauthorized to execute on the virtual machine host because the operational characteristic of the virtual machine is operating outside of the policy setting; and
halting the virtual machine from further operation, pausing the virtual machine, or deleting the virtual machine in response to determining that the virtual machine is unauthorized.

16. The system as recited in claim 15, wherein the memory further bears instructions that, upon execution by the processor, cause the processor to perform operations comprising:
sending the operating characteristic to the virtual machine manager; and
receiving an electronic instruction to halt operation of the virtual machine.

17. The system as recited in claim 15, wherein a single physical machine comprises both the virtual machine host and the virtual machine manager.

18. The system as recited in claim 15, wherein the memory further bears instructions that, upon execution by the processor, cause the processor to perform operations comprising:
receiving the request to create the virtual machine through a web interface provided by the virtual machine host.

19. A computer-readable storage medium having computer-executable instructions stored thereon that upon execution by a processor cause the creation and operation a virtual machine through delegated authority the acts comprising:
receiving electronic control instructions from a virtual machine authority, the control instructions comprising a policy setting, the policy setting authorizing a creation of a virtual machine or an operation of a virtual machine;
passing the policy setting to a configuration store;

receiving a user request to create the virtual machine in accordance with a parameter;

determining from the policy setting that the user request can be granted;

sending a first instruction to a virtual machine host, the virtual machine host creates the virtual machine in accordance with a parameter in response to receiving the first instruction;

identifying that the virtual machine at the virtual machine host is unauthorized to execute upon the virtual machine host because the virtual machine is operating outside of the policy setting in the configuration store; and sending a second instruction to the virtual machine host, in response to determining that the virtual machine is unauthorized, the virtual machine host halts the virtual machine from further operation, pauses the virtual machine, or deletes the virtual machine in response to receiving the second instruction.

* * * * *